United States Patent
Kothuvatiparambil (10) Patent No.: US 12,229,663 B2
(45) Date of Patent: Feb. 18, 2025

(54) DEEP LEARNING SYSTEM

(71) Applicant: Bank of America Corporation, Charlotte, NC (US)

(72) Inventor: Viju Kothuvatiparambil, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 1166 days.

(21) Appl. No.: 16/511,482

(22) Filed: Jul. 15, 2019

(65) Prior Publication Data

US 2021/0019611 A1  Jan. 21, 2021

(51) Int. Cl.
*G06N 3/08* (2023.01)
*G06N 3/04* (2023.01)
*G06N 20/20* (2019.01)

(52) U.S. Cl.
CPC ............... *G06N 3/08* (2013.01); *G06N 3/04* (2013.01); *G06N 20/20* (2019.01)

(58) Field of Classification Search
CPC ............. G06N 20/20; G06N 3/08; G06N 3/04
See application file for complete search history.

(56) References Cited

U.S. PATENT DOCUMENTS 9,785,717 B1    10/2017   DeLuca
10,296,848 B1 *  5/2019   Mars ............. G06N 20/20
2015/0310862 A1 10/2015   Dauphin et al.
2017/0017635 A1  1/2017   Leliwa et al.
2017/0060993 A1 * 3/2017   Pendar ........... G06F 16/334

OTHER PUBLICATIONS

Avik Rey, Robust Spoken Language Understanding via Paraphrasing, Sep. 17, 2017.*
Tadhg McDonald-Jensen, Python Queue Count of Unfinished Tasks, Apr. 16, 2016.*
Pavlo Radiuk, Impact of Training Set Batch Size on the Performance of Convolutional Neural Networks for Diverse Datasets, Dec. 2017.*

(Continued)

*Primary Examiner* — Michael J Huntley
*Assistant Examiner* — Adam C Standke
(74) *Attorney, Agent, or Firm* — Weiss & Arons LLP (57) ABSTRACT

A system for determining intents associated with human utterances at a voice response system is provided. The system may involve a machine learning classifier and a deep learning classifier. The machine learning classifier may receive labeled training data. The labeled training data may be sample utterances. Each sample utterance may be assigned an intent. The intent may be the label of the utterance. The intent may be included in a predefined plurality of intents. The machine learning classifier may include a feature engineering and extraction module. The feature engineering and extraction module may identify features specific to each intent. The machine learning classifier may label previously unlabeled utterances received in a production environment. The newly labeled utterances received in the production environment may be used as training data to train a deep learning classifier. After being trained, the deep learning classifier may receive and label previously unlabeled utterances.

5 Claims, 7 Drawing Sheets

(56) References Cited

OTHER PUBLICATIONS

Aaron Kub, Sentiment Analysis Walkthrough Part 2.ipynb, Jan. 24, 2019.*
Tim Pietzcker, Calculaating Time Difference, StackOverflow, Aug. 6, 2010.*
Avik Rey, Robust Spoken Language Understanding via Paraphrasing, Sep. 17, 2017 (Year: 2017).*
Tadhg McDonald-Jensen, Python Queue Count of Unfinished Tasks, Apr. 16, 2016 (Year: 2016).*
Pavlo Radiuk, Impact of Training Set Batch Size on the Performance of Convolutional Neural Networks for Diverse Datasets, Dec. 2017 (Year: 2017).*
Aaron Kub, Sentiment Analysis Walkthrough Part 2.ipynb, Jan. 24, 2019 (Year: 2019).*
Tim Pietzcker, Calculaating Time Difference, StackOverflow, Aug. 6, 2010 (Year: 2010).*
Nie, Feiping, et al. "Semi-supervised orthogonal discriminant analysis via label propagation." Pattern Recognition 42.11 (Year: 2009).*
Michael Nielsen, "Neural Networks and Deep Learning," http://neuralnetworksanddeeplearning.com/, Determination Press, 2015.
Brett Grossfeld, "A Simple Way to Understand Machine Learning Vs. Deep Learning," https://www.zendesk.com/blog/machine-learning-and-deep-learning/, Zendesk, Jul. 18, 2017.
Connor Shorten, "Machine Learning vs. Deep Learning," https://towardsdatascience.com/machine-learning-vs-deep-learning-62137a1c9842, Medium, Sep. 7, 2018.
"A List of Cost Functions Used in Neural Networks, Alongside Applications," https://stats.stackexchange.com/questions/154879/a-list-of-cost-functions-used-in-neural-networks-alongside-applications, Sycorax, Sep. 24, 2018.
"Machine Learning," https://en.wikipedia.org/wiki/Machine_learning, Wikimedia Foundation, Inc., Jun. 24, 2019.
"Deep Learning," https://en.wikipedia.org/wiki/Deep_learning, Wikimedia Foundation, Inc., Jun. 22, 2019.
"Feature Extraction," https://en.wikipedia.org/wiki/Feature_extraction, Wikimedia Foundation, Inc., Jun. 27, 2019.
"Convolutional Neural Network," https://en.wikipedia.org/wiki/Convolutional_neural_network, Wikimedia Foundation, Inc., Jul. 9, 2019.
"Recurrent Neural Network," https://en.wikipedia.org/wiki/Recurrent_neural_network, Jul. 12, 2019.

* cited by examiner

DEEP LEARNING SYSTEM

FIELD OF TECHNOLOGY

This disclosure relates to automated identification of an intent of a human utterance. Specifically, this disclosure relates to using deep learning to improve the accuracy and scalability associated with systems for providing machine-detected intents.

BACKGROUND OF THE DISCLOSURE

A classification model is a model used for classifying an unidentified data element into a previously-identified classification container. Classification models are used in a variety of computer applications. Classification models are used in applications that involve artificial intelligence ("AI"). Classification models enable AI systems to automatically classify previously-unclassified data elements.

Machine learning is a subset of artificial intelligence. Machine learning uses algorithms to parse data using a model, learn from the parsed data and make decisions based on what it has learned. Typically, the model used to parse the data is created manually. Many models include man-made feature extraction and engineering modules. The feature extraction and engineering modules identify different core features from training data elements, and, extract one or more of the identified core features from the training data elements. The extracted features are used to create sub-models, each of which corresponds to a different distinct category. The sub-models are later used to correctly classify an unclassified data element. During execution, a machine-learning system receives data elements, and determines, based on the model and sub-models, which features are included, and, therefore, how to classify each received data element.

The model described above may also be referred to as a linear classification model. In a linear classification model, each sub-model corresponds to a class. Each class includes a value for each of a plurality of predefined features. The linear classification model plots each class as a vector on a graph, based on the values assigned to the features. When an unclassified data element is received, the linear classification model extracts feature values from the unclassified data element. The extracted feature values are plotted on the graph. The linear classification model attempts to draw a line (hence, the term linear) through the plotted values. The linear classification model compares the drawn line, which corresponds to the unclassified data element, to the previously-plotted vectors. The linear classification model makes a best-match determination to find the most similar vector. The unclassified data element is then classified in the class that corresponds to the most similar vector.

Because the feature engineering and extraction module or the linear classification model is usually man-made, or manually customized, for a specific application, the feature extraction and engineering module or the linear classification model is unique to each usage application. Therefore, creating additional classes within the feature engineering and extraction module and/or customizing an existing module or model are resource intensive. Additionally, because of the large amount of manual effort required, the feature engineering and extraction module and the linear classification model may include a non-negligible percentage of human opinion and/or human error.

Furthermore, in a linear classification model, the model attempts to fit a line through all of the detected features in order to make a prediction. The model rarely takes into account anomalous or outlying values.

Deep learning is a subset of machine-learning. Deep learning classifiers are input labeled-training data, otherwise referred to as data that has been classified. The deep learning classifiers learn from the inputted data, and use the learned information to correctly classify unlabeled data during execution. It should be appreciated that there is substantially no manual feature engineering or manual feature extraction. A deep learning classifier creates, absent human interaction, a non-linear, multi-dimensional classification model based on the labeled-training data.

Deep learning classifiers typically utilize a layered structure of algorithms known as an artificial neural network ("ANN") to create the non-linear, multi-dimensional classification model. An ANN mimics the biological neural network of the human brain. The ANN is comprised of layers of neurons. Each neuron, included in each layer, takes one or more inputs and produces one output. The output is based on the values of the inputs as well as a weight associated with each inputted value. As such, one input can carry more weight than another input. The value that is output from a neuron is then used as the input value for each neuron on a subsequent layer. The values are passed though the multiple layers of the network. The first layer in a network is known as the input layer. The input layer receives input values associated with a data element. During the training of an ANN, the data element also includes a classification. The intermediate layers of the ANN are known as hidden layers. The hidden layers create the robust network of connections between inputs and outputs. The last layer of the network is known as the output layer, and usually outputs a classification. During execution time, the output layer outputs a classification for a heretofore-unclassified inputted data element.

Many ANNs are feed-forward artificial neural networks, which means that the output from a neuron on a first layer is only input to a neuron on a second layer. Feed-forward neural networks are different from recurrent neural networks, in which outputs may be used as inputs for the same layer or a previous layer.

A neural network that includes more than two layers is considered to be using a deep learning algorithm. Therefore, an ANN comprises three or more layers. Each layer of neurons in an ANN builds upon the previous layers. The connections between the neurons on the multiple layers enable the deep learning system to accurately identify and classify previously unclassified data elements.

There are advantages that deep learning has over machine learning. Specifically, deep learning produces more accurate, and more refined, results than machine learning. Because the features are automatically derived from sample data sets and not dependent on a human, the system typically produces more accurate results when presented with a relevant and sufficiently large amount of training data.

Additionally, deep learning systems are able to accommodate more classes or more classification types in a much faster manner. This is because deep learning algorithms do not require feature engineering and extraction modules in order to create sub-models for each class. All that is needed to implement a new class type within a deep learning algorithm is a large amount of labeled training data. This makes deep learning systems more scalable.

There are also disadvantages associated with deep learning algorithms. Specifically, deep learning systems require relatively huge amounts of training data as compared to machine learning systems. As an example, a machine learning system for a speech recognition application requires approximately 20,000 labeled training data elements to achieve optimal accuracy. However, a deep learning system for the same speech recognition application requires approximately 2,000,000 labeled training data elements to achieve optimal accuracy. Therefore, a deep learning system requires two orders of magnitude more training data than a machine learning system.

Currently, training data is labeled manually. Therefore, it may be difficult to utilize a deep learning system because it requires a large amount of manually labeled training data.

It would be desirable to have a system that overcomes the challenges associated with deep learning, namely, generation of large amounts of labeled training data. It would be desirable for the system to automatically generate labeled training data. It would be further advantageous to have a system that uses machine learning to generate training data. It would be further desirable to couple that machine learning system to a deep learning system, where the deep learning system is fed labeled training data from the machine learning system.

SUMMARY OF THE DISCLOSURE

A method for bootstrapping a machine learning system to generate training data for a deep learning system is provided.

The system may include a machine learning subsystem. The machine learning subsystem may include a training module. The training module may include a feature engineering and extraction module. A feature engineering and extraction module may be a module that determines core features of a data element.

The training module may be operable to receive a predetermined number of labeled training data elements. Each training data element may correspond to a class included in a plurality of classes. The training module may also be operable to generate a plurality of sub-models that correspond to the plurality of classes. The plurality of sub-models may be based in part or in whole on the received labeled training data elements. The sub-model generation may be executed by the feature engineering and extraction module.

The machine learning subsystem may also include an execution module. The execution module may be operable to receive a plurality of live unlabeled data elements. The live labeled data elements may be known as data elements from a production environment. Each live unlabeled data element may be transmitted by an entity. One exemplary entity may transmit multiple live unlabeled data elements. Another exemplary entity may transmit a single live unlabeled data element.

The execution module may also label each live unlabeled data element. The execution model may label each live data element based on the sub-models. The execution model may locate a sub-model that aligns best with the unlabeled data element. The execution module may label the previously unlabeled data element with the class of the sub-model that aligns best with the unlabeled data element. The labeling may utilize a linear classification model, as described above.

The execution module may present the label to the entity that transmitted the data element. The execution module may discern, or determine, whether the label was accurate over a predetermined confidence threshold. The execution module may discern whether the label was inaccurate. The discerning may be based on a plurality of signals inferred during the presenting. The discerning may be based on a plurality of signals received from the entity during the discerning.

The plurality of signals may include whether the entity completed a plurality of tasks associated with the data element label. The plurality of signals may include a number of steps used by the entity to complete an action associated with the data element label. The plurality of signals may include whether the entity abandoned communication with the execution module. The plurality of signals may include an amount of time associated with completing the plurality of steps. The plurality of signals may include whether the plurality of steps was completed or abandoned. The plurality of signals may include a sentiment received from the entity. The sentiment received from the entity may be one of the signals and/or a combination of weighted signals. The plurality of signals may include feedback received from the entity. Examples of feedback may be that the label was correct or that the label was incorrect.

The execution module may transmit the labeled live data elements to the deep learning subsystem. The labeled data elements which are transmitted may be the labeled data elements that were determined to be accurate over the predetermined confidence threshold.

The system may also include a deep learning subsystem. The deep learning subsystem may include an artificial neural network. The artificial neural network may be a feed-forward network. The artificial neural network may be a convolutional neural network. A convolutional neural network may be a network that uses the mathematical operation convolution. Convolutional neural networks may use convolution in place of matrix multiplication in at least one of their layers. The artificial neural network may be a recurrent neural network. Recurrent neural networks may be networks in which the connections between nodes form a directed graph along a temporal sequence. As opposed to feed-forward networks, recurrent neural networks can use their internal state to process sequences of inputs. Recurrent neural networks may include directed acyclic graphs, which can be unrolled into a feed-forward neural network, or directed cyclic graphs, which cannot be unrolled.

The deep learning subsystem may include a training module. The training module may be operable to receive the labeled live data elements from the machine learning subsystem. The training module may be operable to use the received labeled live data elements to train the artificial neural network. The training of the artificial neural network may enable to artificial neural network to identify inputted, unlabeled data elements.

The deep learning subsystem may also include an execution module. The execution module may receive an unlabeled data element directly at the deep learning subsystem.

It should be appreciated that the machine learning subsystem may be operable upon receipt of approximately 20,000 labeled data elements. In production, the machine learning subsystem may receive upwards of 10 million unlabeled data elements, and, therefore produce upwards of 10 million labeled data elements. The millions of labeled data elements may then be input into the deep learning system to train the deep learning subsystem. The number of labeled data elements used to train an accurate deep learning system may be two orders of magnitude, 10,000 percent more than the number of data elements, used to train an accurate machine learning system.

Upon training, the deep learning subsystem may be capable of receiving unlabeled production data elements, and classifying the unlabeled production data elements. Because deep learning systems perform deeper analysis on the data elements, the output of the deep learning subsystems may output more accurate data. Deep learning systems may also be more scalable than machine learning systems.

The system may be compatible with various applications. Such applications may include speech recognition systems, handwriting analysis systems, natural language systems and any other suitable systems.

Speech recognition systems may be computer systems that receive human speech, analyze human speech and automatically generate a response or a reaction to the human speech. Human speech may also be known as human utterances. An utterance may be a word or combination of words. The utterance may be spoken, typed, written, gestured, or otherwise conveyed.

The computer system may determine an intent for the human utterance. The intent may be the intended meaning underlying the utterance. The intent may be selected from a predefined plurality of intents.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

A method for determining intents associated with human utterances at a voice response system is provided. The method may involve a machine learning system and a deep learning system.

The method may include receiving a predetermined number of labeled training utterances at a training module of the machine learning system. Each labeled training utterance may include an utterance and an intent. The intent may be included in a plurality of intents.

The method may include generating a plurality of sub-models that correspond to the plurality of intents. A feature engineering and extraction module at the training module of the machine learning system may generate the plurality of sub-models that correspond to the plurality of intents.

The method may include receiving a plurality of live unlabeled utterances at an execution module in the machine learning subsystem. Each live utterance may be transmitted by an entity.

The method may include identifying, at the execution module, a sub-model that corresponds to each unlabeled utterance.

The method may include, for each live utterance, presenting a series of steps associated with the intent, to the entity that transmitted the live utterance.

The method may include identifying, over a predetermined confident threshold, whether each identified intent was accurately assigned or inaccurately assigned. The identifying may be based on a plurality of series received during and after the presenting the series of steps.

The method may include training an artificial neural network of the deep learning system using the received live utterances and the associated intents. The method may include utilizing an active learning module to determine which intents should be transmitted to the artificial neural network.

The method may include receiving an unlabeled utterance directly at the deep learning system. The method may include accurately determining an intent for the unlabeled utterance.

The method may include inputting a new intent that is not included in the plurality of intents directly into the deep learning system by inputting a plurality of labeled intents, each of which corresponds to, and forms, the new intent.

The system described above may enable use of a deep learning system. Operation of the system obviates the need for the conventional, manually-intensive task of generating large amounts of training data required for operation of the deep learning system. It should be appreciated that experiments using this system produced unexpected, and surprisingly advantageous, results.

One experiment included inputting 100% accurately labeled training data into the machine learning classifier in order to train the machine learning classifier. The trained machine learning classifier, when used on unlabeled production data, labeled the production data with an accuracy rate of 81%. The production data that was labeled with an accuracy rate of 81% was inputted as labeled training data for a deep learning classifier. The deep learning classifier was then trained using the 81% accurately labeled production data.

The trained deep learning classifier, when used on unlabeled production data, labeled the production data with an accuracy rate of 79.5%. Therefore, the input to output accuracy ratio of the deep learning classifier was 17.5% better than the machine learning classifier. Furthermore, the machine learning classifier used in the experiment was a 2-3-year-old classifier, which means that it already achieved 2-3 years of learned behavior. The deep learning classifier used in the experiment was a newborn classifier. As a result of this experiment, it may be understood that this system produced unexpectedly advantageous results—i.e., that the deep learning classifier achieved a 17.5% input to output accuracy ratio increase.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
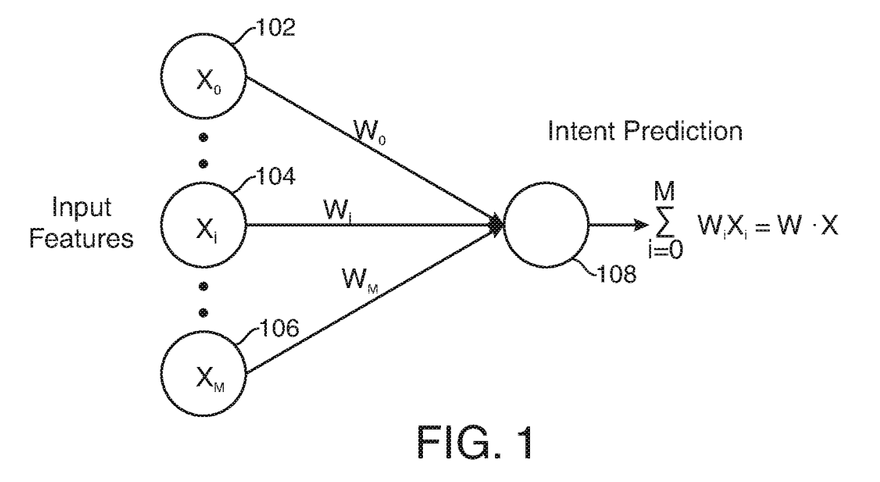
FIG. 1 shows an illustrative diagram in accordance with principles of the disclosure.

FIG. 1 shows an illustrative neuron. The illustrative neuron includes input features 102, 104 and 106. Input 102 corresponds to $X_0$. Input 104 corresponds to $X_i$. Input 106 corresponds to $X_M$. Input features 102, 104 and 106 may be features retrieved from an utterance.

$X_0$ may be assigned a weighting factor of $W_0$. $X_i$ may be assigned a weighting factor of $W_i$. $X_M$ may be assigned a weighting factor of $W_M$. The weighting factor may be manually set. The weighting factor may be automatically generated. The weighting factor may be tuned after the neuron's processing.

Inputs 102, 104 and 106 may be values assigned to features. Preferably, the values may be between 0 and 1. Intent prediction 108 may be based on the output of the neuron. The output may be a sum of the values and the weights assigned to those values. The summation algorithm shown is:

$$\sum_{i=0}^{M} W_i X_i = W \cdot X$$

The summation algorithm shown above can be explained as follows: Starting with the input feature labeled 0 until the input feature labeled M: multiply the input value by the associated weight and add the computed value to the previous value. It should be appreciated that the above-described summation algorithm is equivalent to the dot product of W and X, where W and X are vectors whose components are weights and inputs, respectively.

The output of the summation algorithm and/or dot product algorithm is compared to a threshold. If the output of the summation algorithm, or the dot product algorithm, is greater than the threshold, the intent prediction may be set to one. Setting the intent prediction to one may be understood to mean that the identified intent is appropriate for the inputted utterance. If the output of the summation algorithm is less than the threshold, the intent prediction may be set to zero. Setting the intent prediction to zero may be understood to mean that the identified intent is appropriate for the inputted utterance. The threshold may be manually set, or computer-generated.

Another way to introduce the threshold into the algorithm is by using a bias. The bias is equivalent to the negative value of the threshold. The bias is then added to the dot product. If the value of the dot product plus the bias is less than or equal to zero, the intent prediction is set to zero. If the value of the dot product plus the bias is greater than zero, the intent prediction is set to one.

The bias and threshold algorithms described above produce a binary output, either a zero or a one. In order to utilize inputs between 0 and 1 and produce outputs between 0 and 1, a sigmoid neuron may be used. The output of a sigmoid neuron with inputs $x_1$, $x_2$, weights $w_1$, $w_2$, and bias b is as follows:

$$\frac{1}{1 + \exp(-\Sigma_j W_j X_j - b)}$$

The output of the sigmoid neuron is a value between zero and one. If the value of the dot product of W and X plus b is a large and positive number, then the output of the sigmoid neuron is close to one. If the value of the dot product of W and X plus b is a large negative number, then the output of the sigmoid neuron is close to zero. When the value of the dot product of W and X plus b is a modest value, then the output ranges somewhere in between zero and one.

Figure 2:
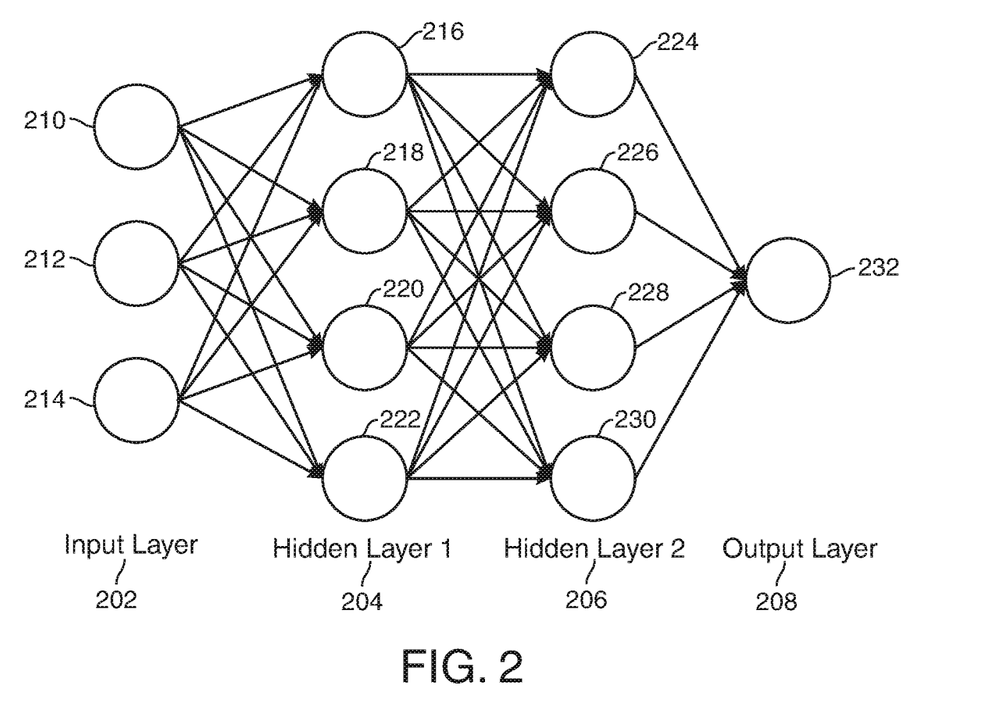
FIG. 2 shows another illustrative diagram in accordance with principles of the disclosure.

FIG. 2 shows an artificial neural network. The artificial neural network includes an input layer, shown at 202, hidden layer 1, shown at 204, hidden layer 2, shown at 206 and an output layer shown at 208.

Input layer 202 may include input neurons 210, 212 and 214. Each of input neurons 210, 212 and 214 may be similar to $X_0$, $X_i$ and $X_M$, shown at 102, 104 and 106 of FIG. 1.

The output of each of 210, 212 and 214 may be input into each neuron included in hidden layer 1. Because there were no manipulations or calculations executed up until this point on the input neurons, the output of input neurons 210, 212 and 214 may be the same as the inputs to input neurons 210, 212 and 214. Hidden layer 1 may include neurons 216, 218, 220 and 222. The output-input lines between input layer, shown at 202, and hidden layer 1, shown at 204, may have weights associated with each of them. Therefore, neurons 216, 218, 220 and 222, included in hidden layer 1, may be inputted the value of each input neuron and the weight associated with each input neuron. It should be appreciated that each output-input line, even from the same input neuron, may be assigned a different weight. It should also be appreciated that the term 'hidden layer' may be defined as a layer, in a neural network, that is not an input layer nor an output layer.

The output of neurons 216, 218, 220 and 222 may be input, with its own assigned weight, into neurons 224, 226, 228 and 230 included in hidden layer 3. The output of neurons 224, 226, 228 and 230, with its own assigned weight may be input into neuron 232, included in output layer 208.

It should be noted that each layer within a neural network may build upon the previous layers. For example, in a facial recognition application, initial layers may define pixels, secondary layers may define lines and curves, tertiary layers may define facial features and final layers may compare the facial features to previously recognized faces. The neural network may be explained as a hierarchical application which goes from pixels to lines and curves to facial features to a face to facial identification.

Figure 3:
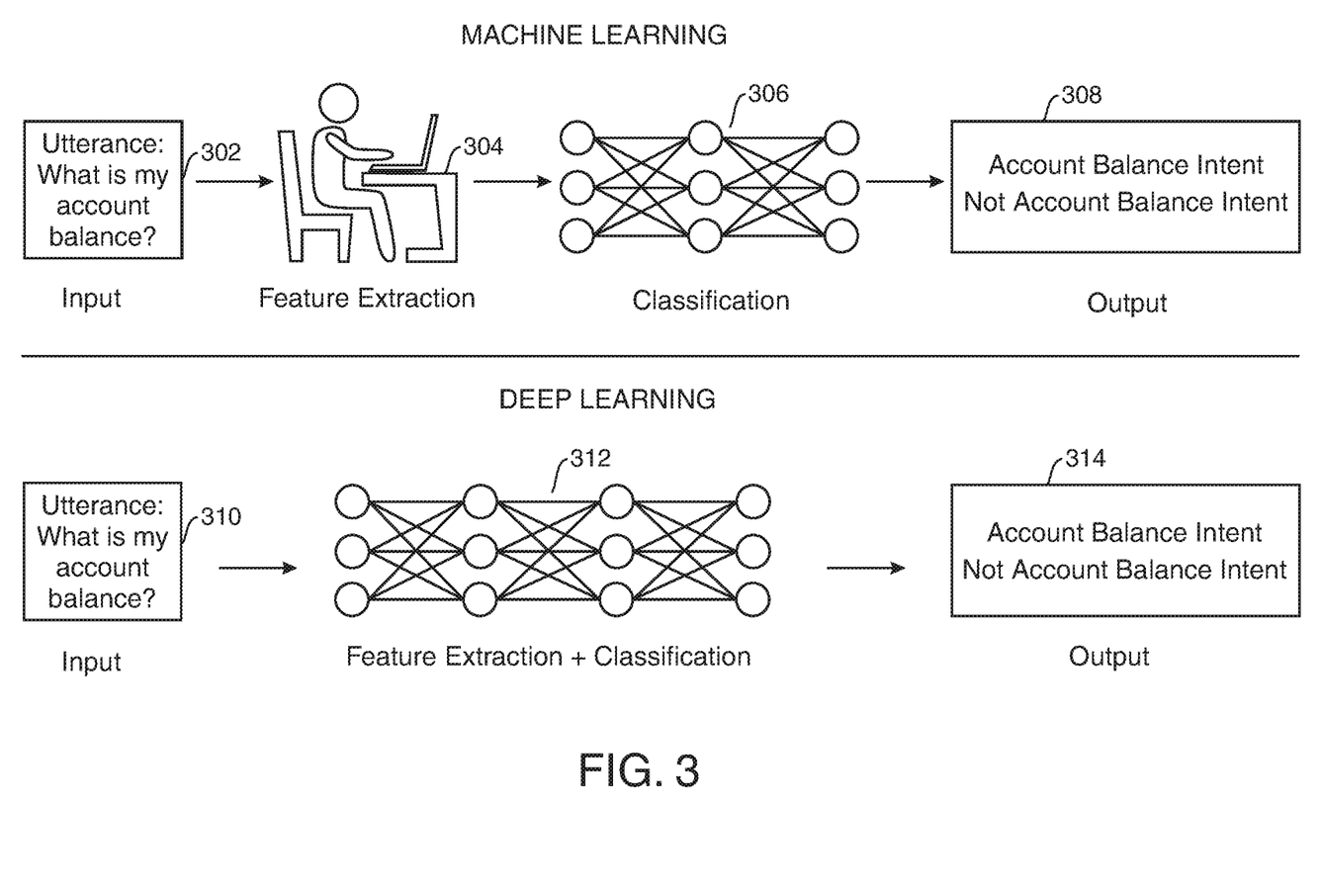
FIG. 3 shows yet another illustrative diagram in accordance with principles of the disclosure.

FIG. 3 shows an illustrative diagram. The diagram shows some differences between machine learning and deep learning. Although, deep learning is considered a subset of machine learning, the illustrative diagram defines machine learning as at least partially manually supervised. The illustrative diagram defines deep learning as a layered structure of artificial neurons with minimal or no human interaction.

Input 302 may be an utterance. The utterance may be What is my account balance? Input 302 may be labeled with the account balance intent. Input 302 may be inputted into feature extraction module 304. Feature extraction module 304 may be, at least partially, manually supervised. Feature extraction module 304 may extract various features from the labeled input. For example, feature extraction module 304 may determine that an utterance includes one or more words, or groupings of words, which may be called n-grams, relating to an account balance intent. N-grams for an account balance intent may include What is my, is my account, my account balance, what is, is my, my account, account balance, what, is, my, account and balance.

Machine learning classification module 306 may classify an inputted non-labeled input based on features extracted from the non-labeled input. The features extracted from the non-labeled input are compared to the previously determined account balance intent features, such as the n-grams for the account balance intent. The classification module makes a decision whether the non-labeled input is either associated with the account balance intent or is not associated with the account balance intent. The decision is outputted via output module 308.

It should be appreciated that a machine learning system may learn during execution. However, machine learning systems typically require manual tuning during the learning process.

Input 310 may be inputted to deep learning feature extraction and classification module 312. Feature extraction and classification module 312 may utilize an artificial neural network trained by large amounts of labeled training data. The training data includes many utterances that are either labeled as being associated with the account balance intent or not being associated with the account balance intent. The feature extraction and classification module determines, absent human intervention, which features are important when determining whether an utterance is or is not associated with the account balance intent.

An unlabeled utterance inputted into feature extraction and classification module 312 is classified as either associated with the account balance intent or not associated with the account balance intent. The classification is outputted via output module 314. The output may be combined with various other outputs associated with other intents in order to determine the appropriate intent.

Figure 4:
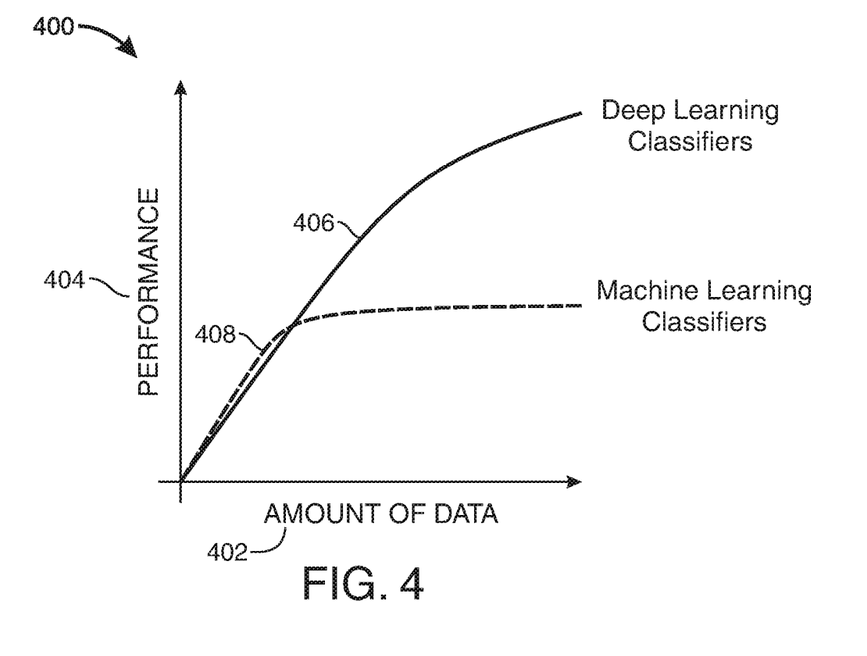
FIG. 4 shows still another illustrative diagram in accordance with principles of the disclosure.

FIG. 4 shows an illustrative diagram. The illustrative diagram includes graph 400. Graph 400 shows a comparison between deep learning classifiers (406) and machine learning classifiers (408).

The x-axis of graph 400 is the amount of data, shown at 402. The y-axis of graph 400 is the performance of the system, shown at 404. The performance of the system may be the accuracy of the system.

As shown in graph 400, the performance of machine learning classifiers plateau at a certain point with respect to the amount of training data received. However, the performance of deep learning classifiers keeps on climbing with larger amounts of training data.

Figure 5:
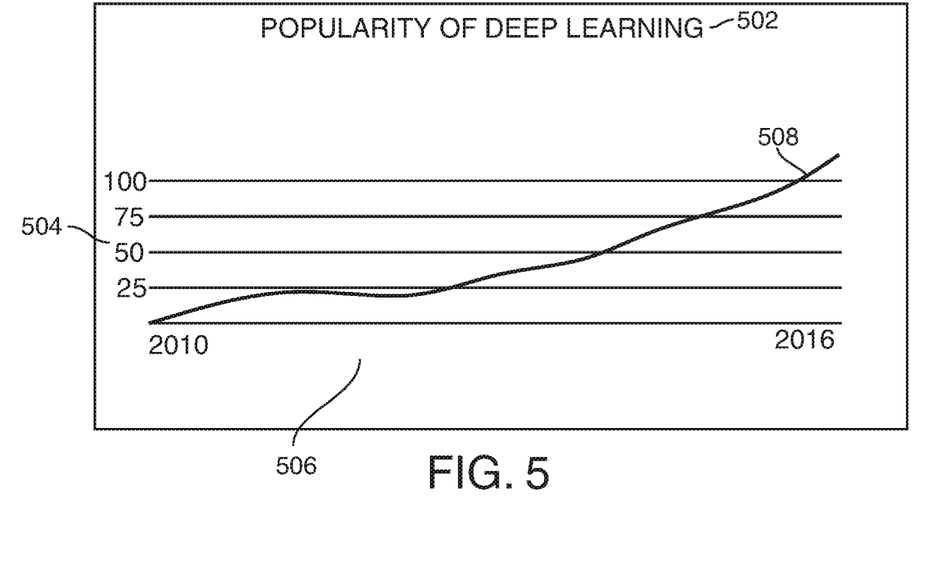
FIG. 5 shows yet another illustrative diagram in accordance with principles of the disclosure.

FIG. 5 shows another illustrative diagram. The diagram shows the rise in the popularity of deep learning, as shown at 502. The x-axis of the graph shows years, as shown at 506. The y-axis of the graph shows a popularity variable. Line 508 shows an increase in the popularity of deep learning classifiers from approximately the year 2010 until approximately the year 2016.

Figure 6:
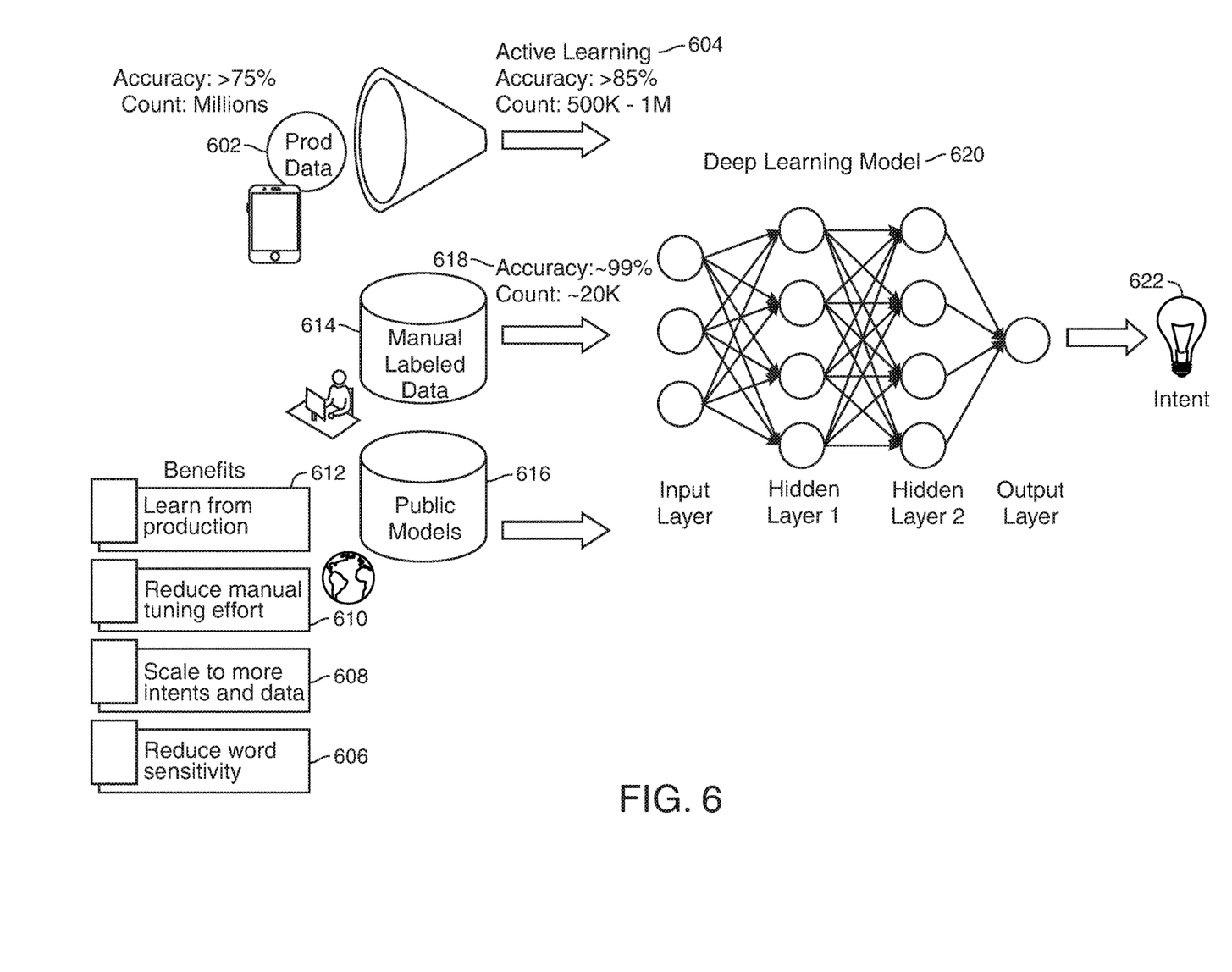
FIG. 6 shows still yet another illustrative diagram in accordance with principles of the disclosure.

FIG. 6 shows an illustrative diagram. Production data 602 may include millions of utterances and intents retrieved from a production environment. The calculated accuracy of the intents properly corresponding to the utterances is greater than 75%. Active learning can be applied to the production data, as shown at 604. Active learning on the production data may raise the accuracy of the intents properly corresponding to the utterances to greater than 85%. Active learning may include weeding out utterances and corresponding intents that are determined to be below a predetermined confidence threshold. The confidence threshold may be a score of how confident the system is that the intent corresponds to the utterance. The confidence threshold may be based on signals, received from an entity that transmitted the utterance, upon transmission of the determined intent.

The following exemplary scenario may correspond to an utterance and determined intent that may be removed during the active learning process: An entity transmitted the utterance, What is my account balance?, the system determined the intent of the utterance to be a routing number intent, the system provided the entity with the routing number intent and the entity abandoned the steps necessary to retrieve the routing number.

The following exemplary scenario may correspond to an utterance and determined intent that may be retained during the active learning process: An entity transmitted utterance, What is may routing number?, the system determined the intent of the utterance to be a routing number intent, the system provided the entity with the routing intent number intent and the entity completed the steps necessary to retrieve the routing number.

The amount of production data that was retrieved via the active learning module may be between 500,000 and one million utterances. The production data retrieved via the active learning module may be inputted into deep learning model 620.

Manually labeled data, shown at 614, which has an accuracy of approximately 99% and a count of approximately 20,000 may also be inputted into deep learning model 620. Public models 616 may also be inputted into deep learning model 620.

Deep learning model 620 may utilize the labeled input to customize its artificial neural network. Deep learning model may be able to receive an unlabeled training data element and produce intent 622.

There may be benefits associated with deep learning models trained by machine learning systems. The benefits may include learning from production data, shown at 612. It should be appreciated that learning from production data may achieve a higher level of accuracy than learning from training data. Production data may be more accurate because it is received from a more diverse body of entities, when compared to training data that is generated by a select group of technical entity employees.

Another benefit associated with deep learning models trained by machine learning systems may be reducing manual tuning effort associated with machine learning systems, as shown at 610.

Another benefit associated with deep learning models trained by machine learning systems may be the ability of the deep learning system to scale to more intents and data, as shown at 608. New intents may be incorporated into the deep learning system by transmitting, to the deep learning system, labeled training data associated with the new intent.

Another benefit associated with deep learning models trained by machine learning systems may be the ability to reduce word sensitivity, as shown at 606. Word sensitivity may be when a classifier thinks that a word is very important with respect to a specific intent. For example, if there are 500 intents and only three intents have the word please, the classifier may think that the word please is very important to these three intents. Therefore, if an utterance includes the word please it will weigh heavily towards the three specified intents. When the system is trained by production data instead of manually created intents, there is a wider range of inputs, and therefore, the word please will probably appear similarly across all intents. Therefore, inaccurate word sensitivity will be reduced.

Figure 7:
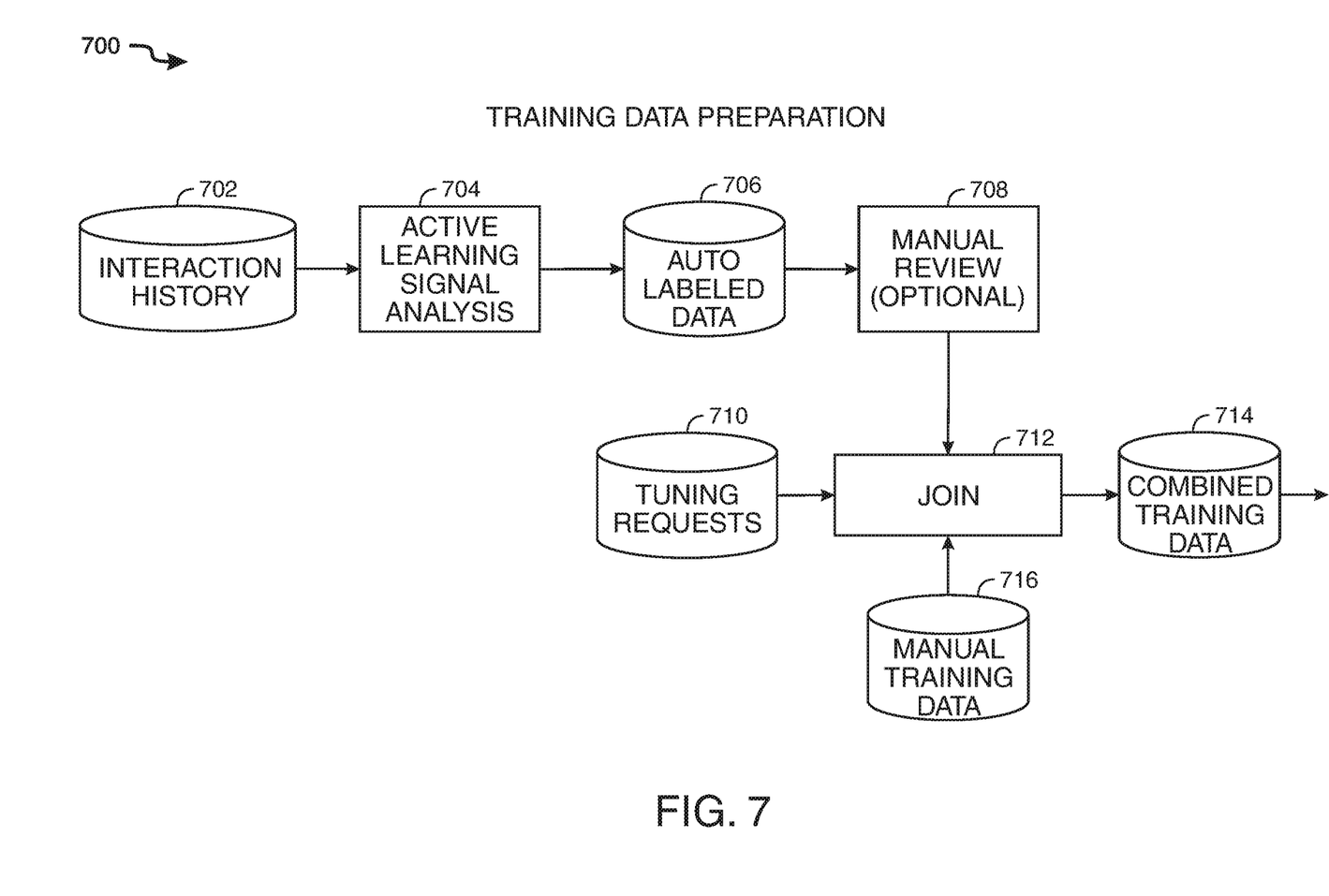
FIG. 7 shows an illustrative flow chart in accordance with principles of the disclosure.

FIG. 7 shows an illustrative flow chart. Flow chart 700 shows training data preparation. Interaction history 702 may be a database of labeled production data.

Active learning signal analysis 704 may be a process to determine whether the entity that transmitted the utterance was satisfied with the intent received. Active learning may include sentiment analysis. Sentiment analysis may include determining the reaction of the entity. An example of sentiment analysis that may lean towards not accurate may be if a transfer intent usually takes five steps to complete and the entity abandons the intent after two steps. Another example of sentiment analysis that may lean towards accurate may be if the entity completes the steps associated with the intent. Another example of sentiment analysis may be good or bad feedback from the entity.

One or more of the signals included in the sentiment analysis may be combined into a single active learning model. The active learning model may predict whether an intent was correctly or incorrectly associated with an utterance.

The active learning system may remove as much as 50% of the production data. However, because there is such a large amount of production data being produced, the system may be trained with 50% of the production data.

Database 706 shows the data that has been previously labeled in the production environment. The data included in database 706 may not include data that has been removed during the active learning process.

Step 708 shows that there may be an optional manual review of the data included in database 706. The data included in auto labeled data 706 may be transmitted, via step 708, or straight to join step 712. Join step 712 may also include tuning request 710. Tuning request 710 may include request to tune intents or tune training data. Manual training data 716 may also be inputted into the join step 712. The join step 712 may produce combined training data database 714.

Figure 8:
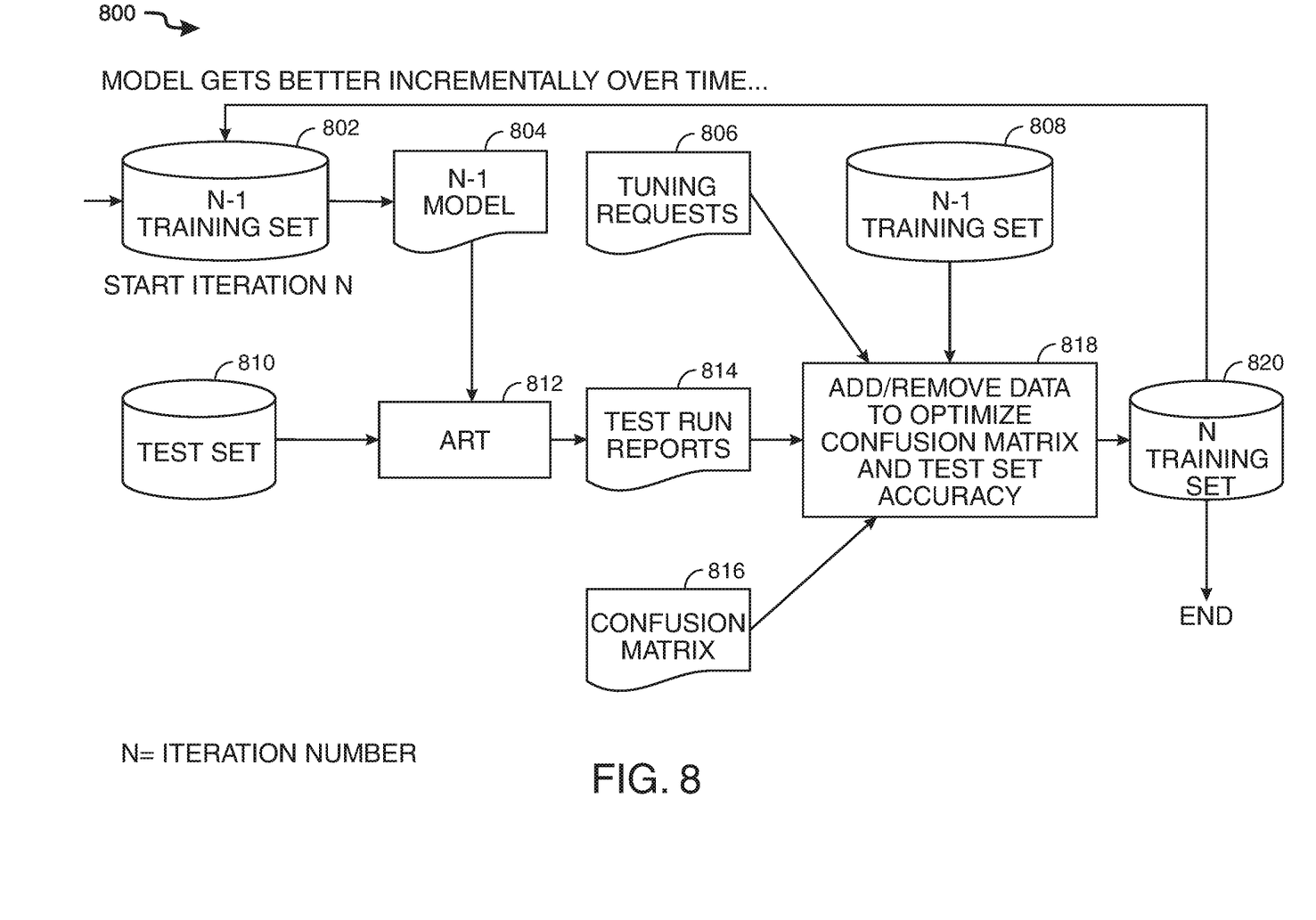
FIG. 8 shows another illustrative flow chart in accordance with principles of the disclosure.

FIG. 8 shows illustrative schematic 800. Schematic chart 800 shows a model that gets better incrementally over time. Training data database 714 may be inputted into N-1 training set, shown at 802.

Schematic 800 shows a high-level overview of the systems and methods for degradation-resistant tuning of an ML model. The tuning process shown in schematic 800 may include other elements and/or steps not shown in the schematic. The tuning process shown in schematic 800 shows one embodiment. Other embodiments may include different elements and/or steps.

The tuning process shown in schematic 800 may be an iterative process. Schematic 800 may show one iteration, beginning with the current (N-1) Training set 802. Current Training set 802 may be used to train the current (N-1) ML model 804. A set of inoperative utterances may be determined via a received tuning request 806, or any other suitable determination. A test set 810 of utterances may be tested via an automated regression tool ("ART") 812. Test run reports 814 may indicate the overall accuracy of the system. At step 818, the current training set 808 may be modified and tested along with confusion matrix 816. If the test results show improved accuracy across the system, the modifications may be deployed into the next iteration of the training set, N (820).

Figure 9:
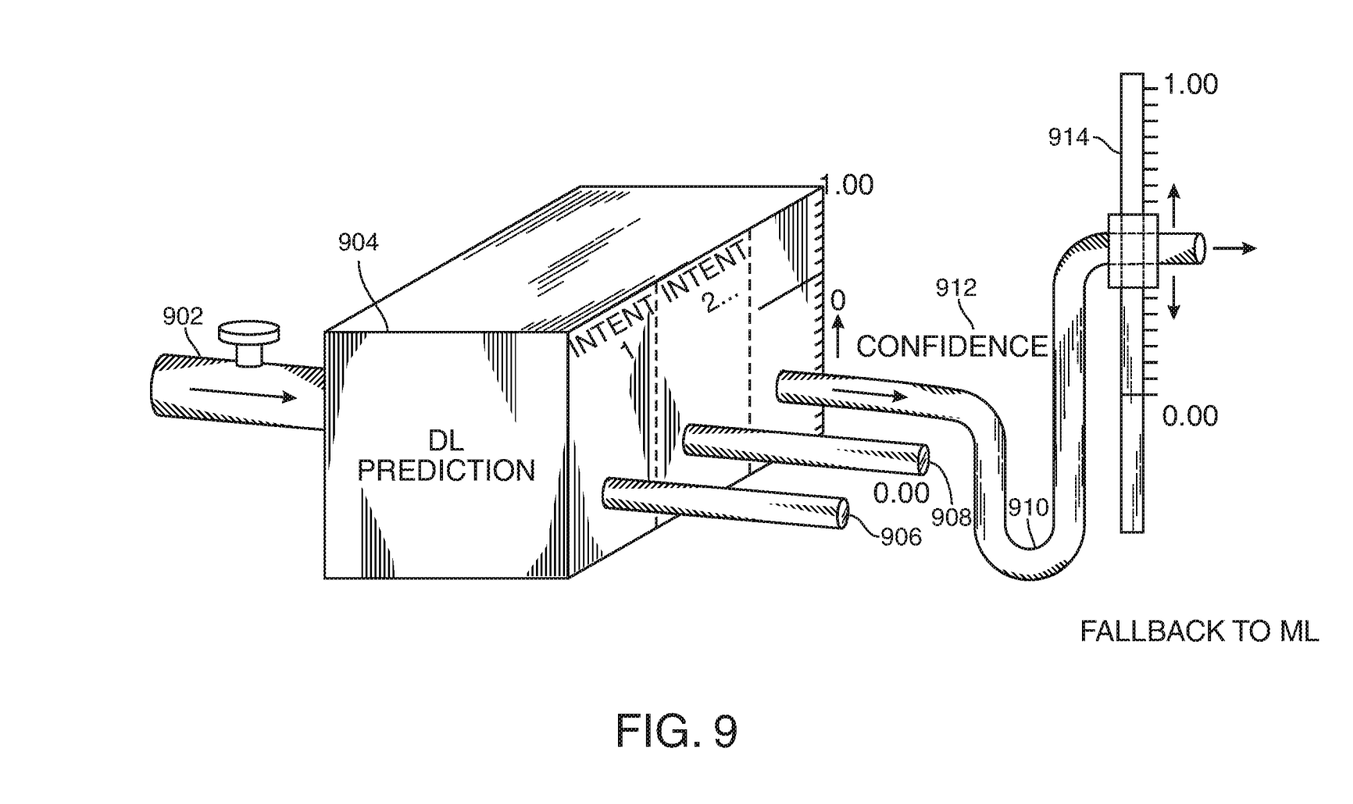
FIG. 9 shows an illustrative diagram in accordance with principles of the disclosure.

FIG. 9 shows an illustrative diagram. Deep learning prediction classifier 904 may be trained using various labeled training data elements.

Deep learning prediction classifier may receive an unlabeled data element via pipe 902. Deep learning prediction classifier 904 may determine and label an intent for the received data element. The data element may be transmitted out the pipe that corresponds to the label of the intent. The intent may be intent 1, shows at 906, intent 2, shows at 908 or any other suitable intent, not shown.

The system may plot the newly labeled utterance with respect each intent. The label may be a confidence label, as shown at 912. The pipe, shown at 910 (which may also be included for pipes 906 and 908, however not shown) may be an output neuron of an artificial neural network associated with deep learning prediction system 904. The deep learning prediction system 904 may determine a value for the correspondence between the intent and the utterance. When system 904 is more confident that the intent matches the utterance, the determined value may be closer to 1. When system 904 is less confident that the intent matches the utterance, the determined value may be closer to 0. The determined value of how confident the deep learning system is sure that the intent matches the utterances is where the newly labeled utterance is plotted on graph 914. The output of a neuron, as explained above, is typically between 0 and 1. Therefore, an output close to 1 may indicate greater confidence than an output close to 0. In this scenario, the confidence level may be determined to be between 0 and 1.

Thus, a deep learning system is provided. Persons skilled in the art will appreciate that the present invention can be practiced by other than the described embodiments, which are presented for purposes of illustration rather than of limitation. The present invention is limited only by the claims that follow.

What is claimed is:

1. A method for determining intents associated with human utterances at a voice response system, the method comprising:
  receiving a predetermined number of labeled training utterances at a training module of a machine learning system, each labeled training utterance comprising an utterance and an intent, the intent being included in a plurality of intents;
  generating, by a feature engineering and extraction module, based in part on the received labeled training utterances, at the training module of the machine learning system, a plurality of sub-models that correspond to the plurality of intents;
  receiving, at an execution module in the machine learning subsystem, a plurality of live-production environment unlabeled utterances, each live utterance being transmitted be a third-party entity included in a diverse body of entities, said third-party entity located within a production environment;
  identifying, with an accuracy rate of 62%, at the execution module, a sub-model, include in the plurality of sub-models, that corresponds to each unlabeled utterance;
  for each live utterance, presenting, to the third-party entity that transmitted the live utterance, a series of steps associated with the intent that corresponds to the identified sub-model;
  identifying, over a predetermined confidence threshold, said identifying being based on a plurality of signals received during, and after the presenting the series of steps, whether each identified intent was accurately assigned or inaccurately assigned;

transmitting to a deep learning system, each live utterance and the associated intent that was determined to be accurately assigned over a predetermined confidence level;

training an artificial neural network of the deep learning system using the received live utterances and the associated intents;

receiving an unlabeled utterance directly at the deep learning system; and accurately, with an accuracy rate of 79.5%, determining an intent for the unlabeled utterance.

2. The method of claim 1, wherein the artificial neural network is a feed-forward network.

3. The method of claim 1, further comprising inputting a new intent that is not included in the plurality of intents directly into the deep learning system by inputting a plurality of labeled intents, each of which corresponds to, and forms, the new intent.

4. The method of claim 1, wherein the plurality of signals includes an amount of time associated with completing the plurality of steps.

5. The method of claim 1, wherein the plurality of signals includes whether the plurality of steps was completed or abandoned.

\* \* \* \* \*